United States Patent [19]

Mitchell

[11] 3,768,032

[45] Oct. 23, 1973

[54] ACOUSTIC SURFACE WAVE DEVICES

[75] Inventor: Richard Frank Mitchell, Salfords, near Redhill, England

[73] Assignee: U.S. Philips Corporation, New York, N.Y.

[22] Filed: May 19, 1972

[21] Appl. No.: 254,881

[30] Foreign Application Priority Data

May 24, 1971 Great Britain .................. 16,641/71

[52] U.S. Cl. .................. 333/30 R, 333/72, 310/9.8

[51] Int. Cl. .......................... H03h 9/30, H03h 9/32

[58] Field of Search .......................... 333/30 R, 72; 310/9.8, 8.1

[56] References Cited

UNITED STATES PATENTS

| | | | |
|---|---|---|---|
| 3,289,114 | 11/1966 | Rowen | 333/30 R |
| 3,696,312 | 10/1972 | Kuhn et al. | 333/30 R X |

OTHER PUBLICATIONS

Tseng, "Surface Ultrasonic Wave Parametric Amplifier" in IBM Technical Disclosure Bulletin, Vol. 12, No. 12, Mar. 1970, pp. 1699–1700.

*Primary Examiner*—Rudolph V. Rolinec
*Assistant Examiner*—Marvin Nussbaum
*Attorney*—Frank R. Trifari

[57] ABSTRACT

An acoustic surface wave device having a low capacitance transducer array comprising a pair of parallel strip terminal electrodes at each end and a plurality of electrically isolated intermediate electrodes regularly spaced between them. Each intermediate electrode is shown either as a wide strip or preferably as a pair of narrower spaced parallel strips electrically connected together. Since the piezoelectric effect is determined by the induced electrical charge, which is the same for each electrode, a form of weighting is disclosed in which the length of the electrodes varies inversely with source strength, and only that part of the acoustic surface wave beam whose width corresponds to the shortest electrode is employed.

13 Claims, 4 Drawing Figures

ACOUSTIC SURFACE WAVE DEVICES

Figure 1:
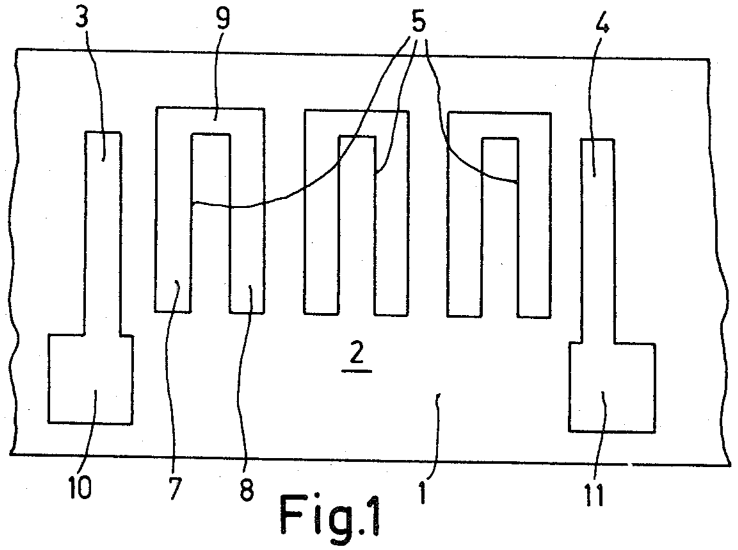

This invention relates to electromechanical devices employing acoustic surface waves.

The use of acoustic surface waves has enabled delay devices and frequency selective devices to be manufactured which are small, compact and are moreover compatible with integrated circuit manufacturing techniques. Such devices make it possible to avoid difficulties, such as bulk and manufacturing cost, associated with the provision of inductors.

An acoustic surface wave device is commonly formed by a thin wafer of piezoelectric material on one surface of which a launching and a receiving transducer are arranged. Each transducer normally comprises an inter-digital array of parallel strip electrode pairs, the arrays being formed by a photolithographic process from a layer of a suitable metal, such as gold, deposited on the surface of the wafer.

In practice this type of transducer can have an inconveniently large capacitance with piezoelectric materials of large dielectric constant. It has also been found that in the case of certain piezoelectric materials, including, for example, the ferroelectric ceramic potassium sodium niobate, undesirable distortion of the frequency response of the transducer occurs.

It is an object of the invention to provide an improved acoustic surface wave device with a transducer which reduces or substantially overcomes the abovementioned disadvantageous effects.

According to the invention there is provided an acoustic surface wave device including a body of piezoelectric material having an acoustic surface wave transducer arranged on an acoustic surface wave propagation surface of said body, said acoustic surface wave transducer comprising a plurality of substantially parallel adjacent elongate electrodes conductively separate one from another and so arranged in succession between elongate terminal electrodes substantially parallel thereto that on applying an electrical signal of a predetermined frequency to said terminal electrodes an acoustic surface wave is launched to propagate over said surface.

Each of the conductively separate electrodes can comprise a pair of spaced parallel conductive strips which are electrically connected together. The piezoelectric material can have the property that the generation of acoustic surface waves by an interdigital launching electrode array is determined by the electric charge induced on the surface of the body, and the material can be a ferroelectric ceramic.

The acoustic surface wave transducer can be a launching transducer provided with a weighted distribution of the strengths of the effective acoustic surface wave sources formed by adjacent pairs of electrodes. In the case in which the piezoelectric effect is determined by the electric charge induced at the surface of the body, the lengths of the elongate electrodes of the launching transducer are arranged to be in inverse relationship to the desired source strength and a receiving transducer is so arranged in the path of a beam of acoustic surface waves propagated from the launching transducer that the portion of the receiving transducer which is responsive to acoustic surface waves lies substantially entirely within that part of said beam which is formed by all the pairs of elongate electrodes.

It has been found that in the case of certain piezoelectric substances having a high piezoelectric coupling factor, for example, ferroelectric ceramics, the generation of an acoustic surface wave by an interdigital electrode array is controlled by the charge induced at the surface of the wafer. However in the case of the conventional form of interdigital transducer, it is the voltage applied to the individual electrode elements which is determined by the applied signal. The corresponding electrical charge present at the surface is thus not predetermined by the applied signal and can vary during the passage of acoustic surface waves past the electrode array, as a result of the piezoelectric effect. This variation in the distribution of electrical charge causes an undesirable modification of the frequency response to occur.

By employing the invention, the signal current is applied via terminal electrodes and passes successively via each intermediate adjacent elongate electrode, and in this way the signal current, and hence the signal produced charge, is caused to be the same for each intermediate electrode. Thus while the passage of an acoustic surface wave along this array can cause variations in the potentials of the individual electrodes, the charge distribution is predetermined in relation to the input signals. In addition, the input capacitance of the transducer is significantly reduced by the series connection and, in the case of a launching transducer, it has been found that less electrical breakthrough is caused to an adjacent receiving transducer.

Figure 2:
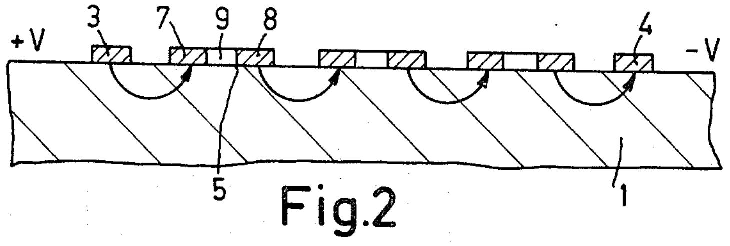
Figure 3:
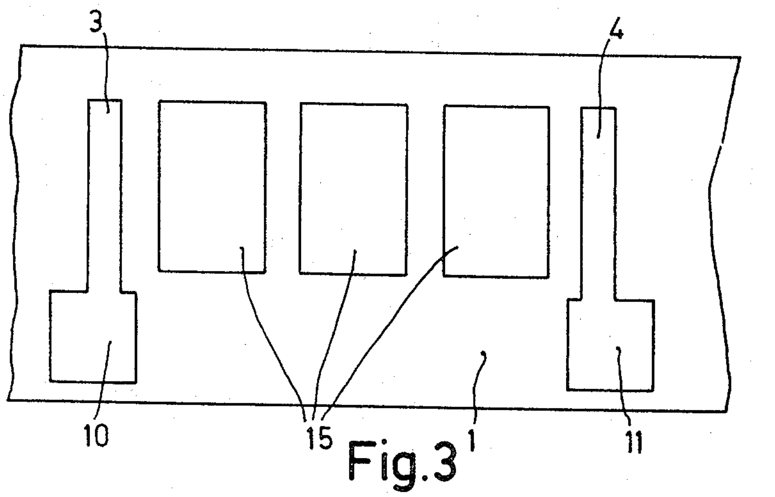
Figure 4:
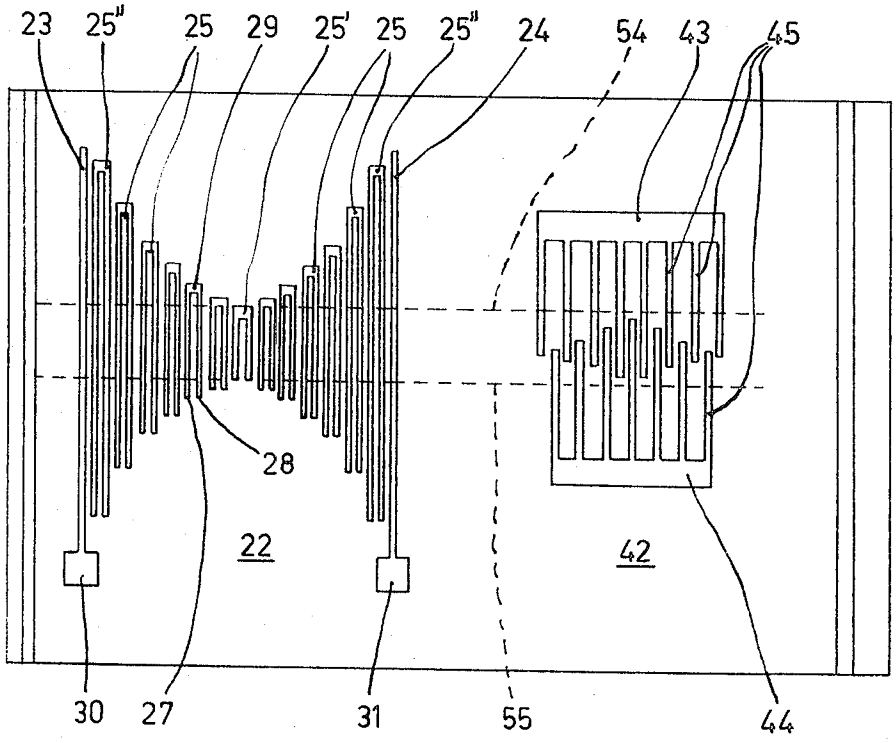

In order that the invention may be clearly understood and readily carried into effect, embodiments thereof will now be described by way of example, with reference to the accompanying drawings, of which:

FIG. 1 illustrates in plan view a portion of an acoustic surface wave device embodying the invention, FIG. 2 illustrates in longitudinal section the distribution of electric field in the embodiment of FIG. 1, FIG. 3 illustrates in plan view an alternative embodiment, and FIG. 4 illustrates an embodiment in which source weighting is carried out.

Reference will now be made to FIG. 1 which shows a preferred embodiment of an acoustic surface wave launching transducer 2 arranged on the upper surface of a body 1 of piezoelectric material suitably potassium sodium niobate. The launching transducer 2 comprises elongate, substantially rectangular terminal electrodes 3, 4 arranged parallel to one another at either end of the transducer 2. A plurality of intermediate elongate electrically conducting electrodes 5 are arranged in a spaced manner between and substantially parallel with the terminal electrodes 3 and 4. The electrodes 5 are conductively separate one from another and from the terminal electrodes 3 and 4. Each electrode 5 is in the form of two parallel rectangular strips 7 and 8 electrically connected by a bridging portion 9. The array 2 of terminal electrodes 3, 4 and intermediate electrodes 5 is formed by depositing a film of gold onto the upper surface of the body 1 and carrying out a photolithographic process. Electrical connection is made to the array 2 via terminal regions 10, 11 formed as extensions to the electrodes 3 and 4.

FIG. 2 illustrates the approximate distribution of electric field in the piezoelectric material of the body 1 wherein it is assumed that terminal electrode 3 is positive with respect to terminal electrode 4 at the moment shown. It will be apparent that the electric field direction between adjacent electrodes is in a favourable configuration to set up an acoustic surface wave. The applied electrical signal will, of course, alternate causing a corresponding alternation in the direction of the electrical field. The alternating current through the device passes from electrode 3 to electrode 4 and vice versa, via the intermediate electrodes 5, thus the signal induced charge variation is predetermined for each electrode 3, 4 and 5. The passage of an acoustic surface wave across the array may cause a variation in the potentials of the individual electrodes but this will have no significant effect on the pass-band response of the transducer which is dependent on the charge distribution.

The series arrangement of the electrodes 3, 5 and 4 in the array 2 reduces the input capacitance of the launching transducer, and this can simplify the drive amplifier design. In addition the amount of electrical breakthrough between the launching transducer and a receiving transducer can be made lower than with a conventional parallel connected transducer if the terminal electrodes of the respective transducers which are adjacent to one another are connected to ground.

An alternative embodiment of the invention is illustrated in FIG. 3 in which the elements common to FIG. 1 are given the same reference numerals and will not be further described. The intermediate electrodes 5 of FIG. 1 are replaced by rectangular electrodes 15. This embodiment can facilitate manufacture, however the performance of this arrangement may not be as satisfactory as that shown in FIG. 1.

The transducers described with reference to FIG. 1 and FIG. 3 can be employed as receiving transducers for acoustic surface waves provided that the terminal electrodes 10 and 11 are connected across an amplifier input circuit having a sufficiently high impedance.

It is sometimes found desirable, for example, when frequency selective filtering is required, to weight the magnitudes of the effective acoustic surface wave sources formed by adjacent pairs of elongate electrodes making up an acoustic surface wave transducer. When the body of piezoelectric material on which the transducer is mounted has the property that the piezoelectric effect is determined by the electric charge induced in the body, source weighting in the transducer array can be carried out in the manner illustrated in FIG. 4, to which reference will now be made. An acoustic surface wave launching transducer 22 and a receiving transducer 42 are arranged on the upper surface of a body 21 of piezoelectric material, suitably potassium sodium niobate.

The launching transducer 22 is generally similar in arrangement to the transducer 2 of FIG. 1 in that it comprises two elongate substantially rectangular terminal electrodes 23, 24 arranged substantially parallel to one another at each end of the transducer, and a plurality of intermediate electrodes 25 arranged therebetween, each comprising two parallel rectangular strips 27, 28 electrically connected by a bridging portion 29. However, the length of the electrodes 23, 24, 25 is made to vary inversely in accordance with the desired source strength. Thus at the centre of the array where the maximum source strength is required, the electrode 25' is made relatively short, and the effective source strength is caused to decrease towards each end of the array by making the electrodes 25 successively longer until the weakest source is produced by the electrodes 25'' and the terminal electrodes 24, 23.

The receiving transducer 42 is a conventional acoustic surface wave transducer comprising an array of interdigital electrode pairs formed by electrodes 43 and 44. Such a transducer is sensitive to a beam of acoustic surface waves directed within the region bounded by the lines 54 and 55 in which adjacent electrode strips 45 forming part of opposite electrodes 43 and 44 overlap in the acoustic surface wave propagation direction. The transducer 42 is substantially insensitive to acoustic surface waves propagating outside this region.

The receiving transducer 42 is so dimensioned that the width of the region bounded by the lines 54, 55 is less than the length of the shortest electrode 25' in the launching transducer 22 so that the sensitive region of the receiving transducer 42 lies substantially entirely within that part of the beam of acoustic surfaces waves, directed thereat by the launching transducer, which is formed by all the pairs of elongate electrodes 23, 24 and 25.

Because the electrical charge induced by the input signal applied across terminals 30 and 31 connected respectively to the terminal electrodes 23 and 24 is the same at each of the intermediate electrodes 25, the shorter electrodes, e.g., 25', will have a relatively high density of signal charge accumulation at the interface with the piezoelectric material of the body 1, whereas the longer electrodes, e.g., 25'', will have a correspondingly reduced surface charge density.

The piezoelectric displacement is dependent on the surface charge density, and, since the receiving transducer 42 is arranged to receive substantially only the acoustic surface waves present in that portion of the beam produced by the launching transducer 22 contained within the broken lines 54, 55, the effective source strength of each pair of electrodes 25 which provides a received signal in the array 42 will be independent on the charge density at the respective electrodes 25, and will therefore be inversely dependent on the overall electrode length.

The receiving array 42 can alternatively take the form of the array described with reference to FIG. 1 or FIG. 3.

What is claimed is:

1. An acoustic surface wave device comprising a body of piezoelectric material, and an acoustic surface wave transducer arranged on an acoustic surface wave propagation surface of said body, said acoustic surface wave transducer comprising a pair of parallel elongate spaced apart terminal electrodes and a plurality of substantially parallel adjacent elongate conductive electrodes conductively separate one from the other and arranged in succession between said elongate terminal electrodes and substantially parallel thereto so that an electrical signal of a predetermined frequency applied to said terminal electrodes will launch a surface elastic wave to propagate over said surface and that an acoustic surface wave propagating over said surface will be detected by said electrodes to cause a corresponding electric signal to occur at said terminal electrodes.

2. An acoustic surface wave device as claimed in claim 1 in which each of the conductively separate elongate electrodes comprises a pair of spaced parallel conductive strips conductively joined together.

3. An acoustic surface wave device as claimed in claim 2 in which said acoustic surface wave transducer is a launching transducer.

4. An acoustic surface wave device as claimed in claim 2 in which the piezoelectric material has the property that the generation of acoustic surface waves by an interdigital launching electrode is determined by the electrical charge induced on the surface of said body.

5. An acoustic surface wave device as claimed in claim 3 in which the piezoelectric material comprises a ferroelectric ceramic.

6. An acoustic surface wave device as claimed in claim 3 in which a weighted distribution of effective acoustic surface wave source strength is provided along said launching transducer by arranging the lengths of said elongate electrodes in inverse relationship with the desired effective source strength, and a receiving transducer arranged on said propagation surface and in the path of a beam of acoustic surface waves propagated from said launching transducer so that the portion of said receiving transducer responsive to acoustic surface waves lies substantially entirely within that part of said beam which is formed by all the pairs of said elongate electrodes.

7. An ultrasonic device comprising a body of piezoelectric material, and a pair of acoustic surface wave transducers spaced apart on a surface of said body for transmitting and receiving, respectively, an acoustic surface wave propagated contiguous to said surface, at least one of said transducers comprising a pair of spaced apart parallel elongate conductive terminal electrodes and a plurality of parallel elongate conductive electrodes insulatively separated from each other and from the terminal electrodes and arranged between said terminal electrodes and parallel thereto.

8. An ultrasonic device as claimed in claim 7 wherein said plurality of elongate electrodes each comprise a pair of spaced parallel conductive members joined together at one end by a conductive member.

9. An ultrasonic device as claimed in claim 8 wherein said one transducer is adapted to receive an alternating electric signal of a given frequency at said terminal electrodes thereby to launch within said body an acoustic surface wave to propagate along said surface.

10. An ultrasonic device as claimed in claim 8 wherein said one transducer is adapted to detect an acoustic surface wave propagating in said body along said surface to derive an alternating electric signal at said terminal electrodes corresponding to an electric signal applied to the transmitting transducer.

11. An ultrasonic device as claimed in claim 9 wherein said plurality of elongate electrodes vary progressively in length between said terminal electrodes.

12. An ultrasonic deivce as claimed in claim 9 wherein said plurality of elongate electrodes vary progressively in length from the mid-point between said terminal electrodes to each of the terminal electrodes.

13. An ultrasonic device as claimed in claim 10 wherein said plurality of elongate electrodes vary progressively in length between said terminal electrodes.

* * * * *